Dec. 1, 1936.  L. R. E. GRATZMULLER  2,062,810
SPEED GOVERNING DEVICE APPLICABLE TO ELECTRIC TRACTION
Filed March 17, 1932  3 Sheets-Sheet 1
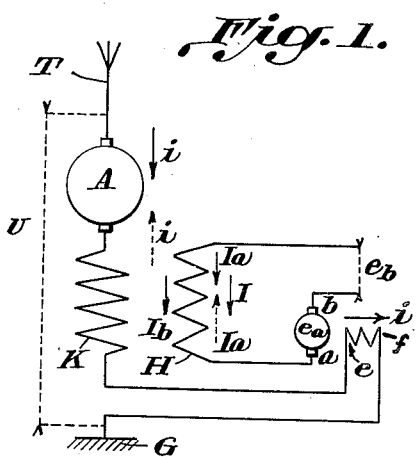
*Fig. 1.*
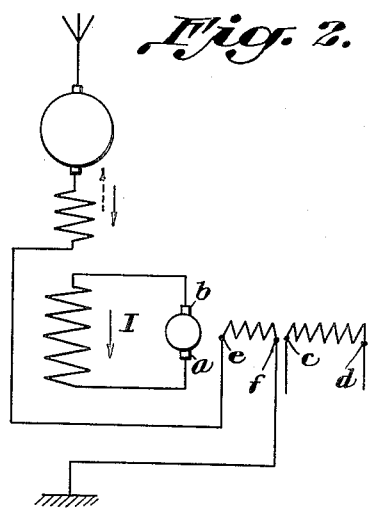
*Fig. 2.*
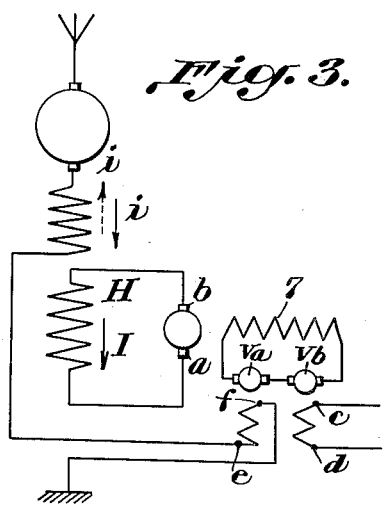
*Fig. 3.*
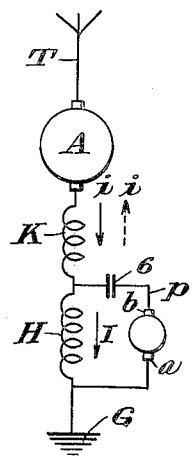
*Fig. 5b.*
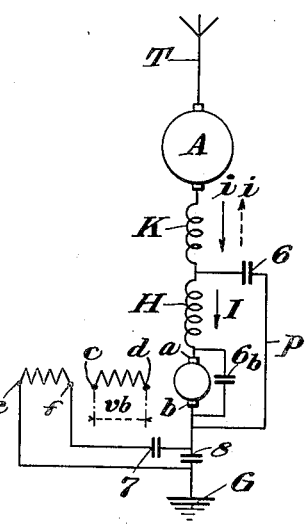
*Fig. 5c.*
*Fig. 5a.*
Inventor:
LOUIS R. E. GRATZMULLER
By Bönnelycke, Young, Emory & Thompson
ATTORNEYS

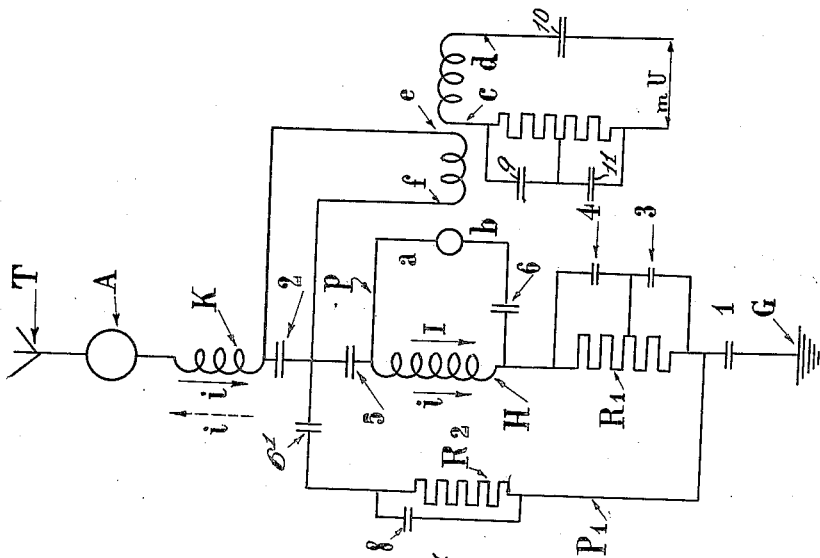
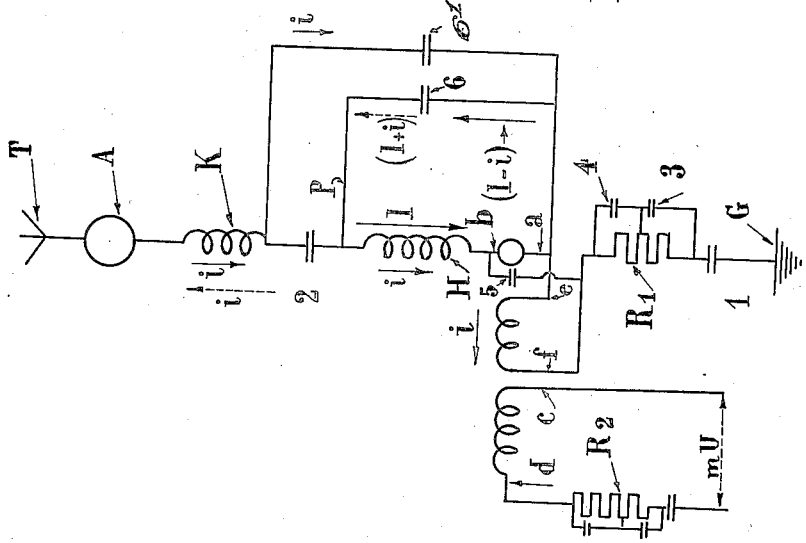

Dec. 1, 1936. L. R. E. GRATZMULLER 2,062,810
SPEED GOVERNING DEVICE APPLICABLE TO ELECTRIC TRACTION
Filed March 17, 1932 3 Sheets-Sheet 3
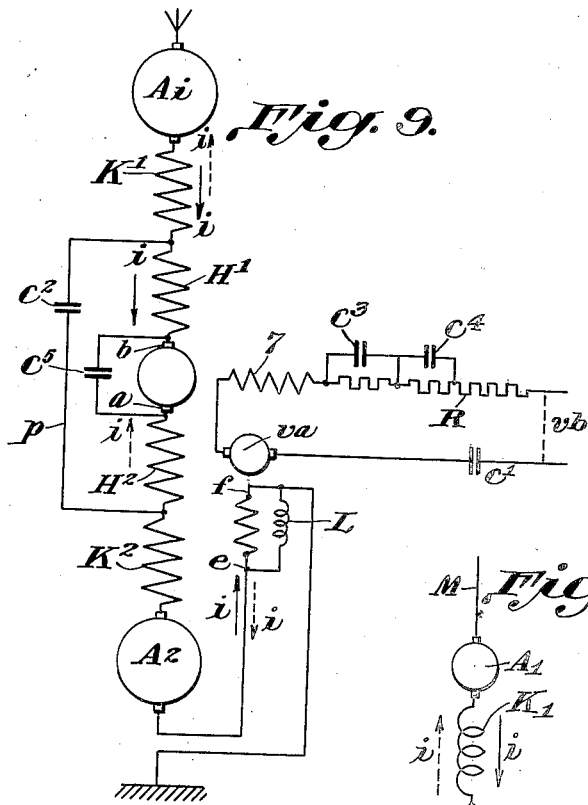
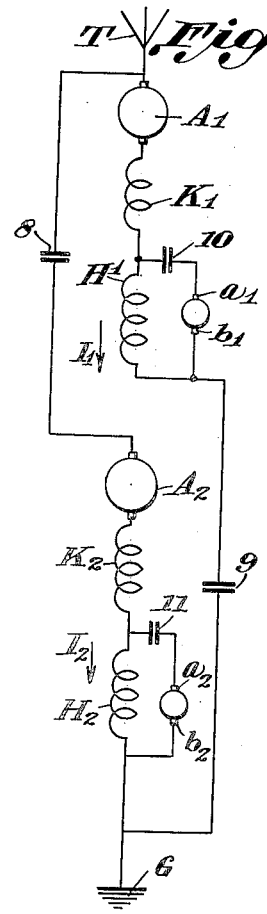
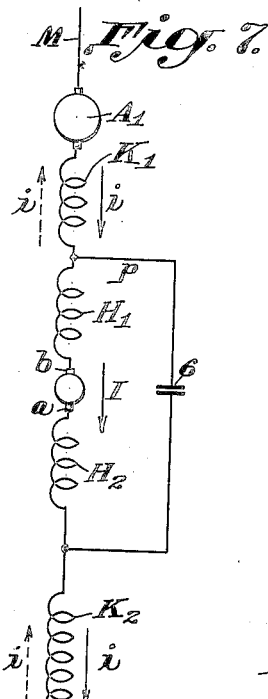
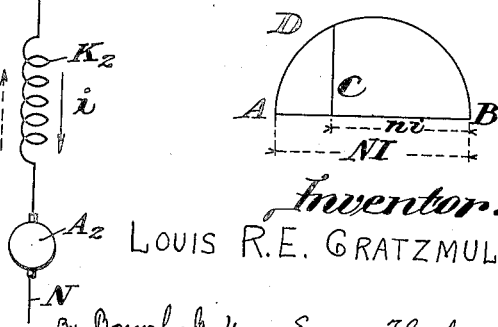
Inventor:
Louis R. E. Gratzmuller
By Bonnelycke, Young, Emery & Thompson
ATTORNEYS Patented Dec. 1, 1936

2,062,810

UNITED STATES PATENT OFFICE 2,062,810

SPEED GOVERNING DEVICE APPLICABLE TO ELECTRIC TRACTION

Louis René Eugène Gratzmuller, Paris, France

Application March 17, 1932, Serial No. 599,559
In France March 25, 1931

7 Claims. (Cl. 172—179)

This invention relates to a speed governing device applicable to electric traction.

The object of this invention is to provide a device for economically governing the speed of direct current dynamos running sometimes as motors and other times as generators. Said device is especially applicable to electric traction dynamos.

In accordance with the present invention, the field windings of the main motors are subjected to series excitation during the starting period—that is, during the acceleration of the motors from rest. As an example use is made of starting rheostats, shunts for shunting the series field windings, and means for changing connections between motors with practically zero loss in the transition resistances.

Further, if it is necessary to limit or reduce the speed whatever it may be at the instant with the interconnection of the motors, the excitation of the motors in series is replaced by compound semi-direct excitation.

The change from series direct operation to compound semi-direct operation is obtained by the introduction of voltages, which I will term $Ea$ and $Eb$, in a circuit obtained by closing a shunt from one part of a series field comprising two windings in series. The voltage $Ea$ increases with the current of the main armature and $Eb$ is an independent voltage of the main dynamo and it is regulatable. The other portion of the field remains excited in direct series and it may be shunted by an inductive or a non-inductive resistance. Also, its number of turns may be varied.

The voltages $Ea$ and $Eb$ may be produced in the armature of auxiliary or exciter dynamos, or more particularly in a single exciter armature.

The present invention will be best understood with reference to the accompanying drawings and the following description.

In all the figures, T and G are the poles of the network, T being a sliding contact, for example, and G a ground contact. A denotes the armature of a main dynamo, K its direct series field winding and H its field winding for series-direct series excitation and series-indirect ampere-turns and for separate excitation. When there are several main dynamos $A_1$, $A_2$, $A_3$, etc., the letters A, K, H are modified by indices 1, 2, 3, etc.

Figure 1 is a schematic diagram illustrating compound semi-direct excitation of a main dynamo.

Fig. 2 is a similar view illustrating semi-direct excitation with a single exciter having two fields.

Fig. 3 is another view similar to Fig. 1 illustrating compound semi-direct excitation with a single exciter having a single field energized by the sum of two separate voltages.

Fig. 4 is a schematic diagram illustrating a modification of the arrangement for converting series-direct excitation into compound semi-direct excitation.

Fig. 5 is a view similar to Fig. 4 showing another modification of the present invention.

Fig. 5a is a chart showing the order of closing the contactors of Fig. 5.

Fig. 5b is a schematic diagrammatic view illustrating a simpler arrangement of connections equivalent to those of Fig. 4.

Fig. 5c is a similar view illustrating a simpler arrangement of connections equivalent to those of Fig. 5.

Fig. 6 is a schematic diagrammatic view of an arrangement of the present invention as applied to two dynamos.

Fig. 7 is a schematic diagrammatic view showing a modification of the invention as applied to two dynamos.

Fig. 8 is a circular diagram of the torque of a compound direct dynamo.

Fig. 9 is a view similar to Fig. 7 illustrating a further modification of the present invention.

Fig. 9a is a view similar to Fig. 5a showing the order of closing the contactors of Fig. 9.

Series direct excitation is the series excitation ordinarily employed heretofore, in which the current $i$ of the armature A goes directly into the field windings. In the present invention, the field windings comprise two parts H and K placed in series and they may be or may not be shunted by inductive or non-inductive resistances.

The term compound semi-direct excitation is applied generally to the excitation produced in the following manner:

1. The current $i$ of the armature A of a main dynamo flows directly through the part K of $n$ turns of the series field winding, shunted or not shunted, and the ampere-turns thus produced are termed series-direct ampere-turns (Fig. 1).

2. In the circuit closed by shunt $p$, the part H of N turns is subjected to the algebraic sum of two voltages.

(a) One voltage $Ea$ has the same sign as the current $i$ of the main armature A. Its absolute value is proportional to $i$ or at least it increases with $i$. The ampere-turns which it produces are therefore proportional to $i$ or at least increased with $i$. For this reason they are called series indirect ampere-turns.

(b) The other voltage $E_b$ is an independent regulatable field voltage taken from any source external to the main dynamo, for example: a network voltage U, voltage of an auxiliary dynamo or sub-exciter driven in any manner at practically constant speed by an electric motor, battery of accumulators, etc. This sub-exciter may also be driven at a speed proportional to that of the wheels or of the corresponding main dynamos. Modes of connection for producing this result are known. The field ampere-turns produced by $E_b$ are therefore essentially separate excitation ampere-turns.

The compound semi-direct excitation is described in French Patent No. 704,054 and is also described and claimed in my U. S. Patent No. 2,004,240.

In motor operation the connections are made in such a manner that the series indirect ampere-turns of the winding H, the series direct ampere-turns of the winding K, and the separate ampere-turns of H should have the same sign.

Nevertheless the signs of the voltages $E_a$ or $E_b$ or of $E_a$ and $E_b$ may be changed during running in motor operation in order to increase the speed.

In generator operation obtained by increasing $E_b$, the series direct ampere-turns of K and the series indirect ampere-turns of H change in sign, while the separate excitation ampere-turns of H under the voltage $e_b$ remain of the same positive sign.

In the slowly variable operation the excitation varies therefore in the same sense as for a compound dynamo either in motor operation or in generator operation.

The winding K has for a purpose to limit overcurrent in rapid transitory operation, for example, when the voltage V of the network varies abruptly. Experiment has shown that it may have a small number of turns.

The excitation of the field winding H by the algebraic sum $E_a + E_b$ enables the weight of copper to be reduced in the field windings of the main dynamo as compared with the ordinary compound dynamo comprising a separate excitation winding.

Fig. 1 shows the connection diagram for compound semi-direct excitation. The arrow $i$ in solid lines shows the direction of the current $i$ in motor operation, and the arrow $i$ in dotted lines shows the direction of the current in generator operation. I is the total current in the field winding H—that is, the sum of the currents $I_a$ and $I_b$ corresponding, respectively, to the voltages $E_a$ and $E_b$, the current $I_a$ having the direction shown by the solid line arrow $I_a$ in motor operation and that shown by the dotted line arrow in generator operation. In Fig. 1 it is assumed that the voltage $E_a$ is generated in the armature $a$—$b$ of a sub-exciter driven at a practically constant speed and excited by the current $i$ of the main armature in the winding $e$—$f$. But the voltages $E_a$ and $E_b$ may be obtained in several different manners.

(a) $E_b$ may be taken from any source, for example, the voltage U of the network with insertion of a rheostat or the voltage of an accumulator battery or of a regulatable exciter driven in any manner, either at approximately constant speed or at a speed proportional to wheel speed, etc.

$E_a$ may be produced in an armature of an exciter dynamo $a$—$b$ at approximately constant speed and excited by winding $e$—$f$ by the current of the main armature A (Fig. 1).

(b) $E_a$ and $E_b$ may be produced not in two separate armatures but in a single armature $a$—$b$ of the exciter dynamo, excited itself by the current $i$ in a first winding $e$—$f$ and in a second winding $c$—$d$ by means of a regulatable voltage $v_b$, (taken like $E_b$ of the paragraph $a$) from any source (Fig. 2).

(c) In a single exciter armature there may be developed the sum of the two voltages $E_a$ and $E_b$ by exciting a single winding of this exciter with the algebraic sum of the two voltages $v_a$ and $v_b$, the voltage $v_b$ increasing with $i$ and the voltage $v_b$ being regulatable and produced in a similar manner to the voltages $E_a$ and $E_b$ of paragraph (b). That is to say, $v_a$ may be developed in a subexciter whereof the winding $e$—$f$ (Fig. 3) is excited by the current $i$, and the other voltage $v_b$ taken from any source or produced in a small sub-exciter $v_b$ excited by a regulatable separate current through the winding $c$—$d$ (Fig. 3).

Since the arrangement of compound semi-direct dynamos permits considerable variations of the field ampere-turns of dynamos A with variations of $i$, it is not necessary to take great pains to distribute equally the currents $i$ between the dynamos A placed in different shunts on the network.

Obviously in motor operation when $E_b$ is increased, the speed is diminished because $i$ will diminish and then reverse, and the dynamo will operate as a generator with regenerated braking.

Several examples will now be given of changing over from motor operation with series direct excitation to compound semi-direct excitation generator operation, and with good utilization of the copper of the windings of the main motor.

In the first system shown in Fig. 4, all the switches are assumed opened. Switches 5, 2 and 1 are closed in order to insert in the shunt connected to the voltage V of the network, the starting rheostat $R_1$ which is progressively short-circuited by the switches 3 and 4. The dynamo A is then a series direct motor with current $i$ as indicated by the arrow $i$ in solid lines. The parts H and K may then be shunted to increase the speed.

The exciter $a$—$b$ driven in any manner at approximately constant speed is then inserted, for which the contactor 5 is opened, with or without insertion of a transition resistance, and a circuit $p$, H is formed by closing the contactor 6. The shunt $p$ may contain a resistance. The exciter dynamo $a$—$b$ has two windings, one $e$—$f$ excited by the current $i$ of the armature A or a portion of $i$ if $e$—$f$ is shunted by an inductive resistance, and the other $c$—$d$ may be subjected to a regulatable voltage $v_b$. Furthermore, $c$—$d$ may have a rheostat $R_2$ in its circuit.

If it is desired to avoid an increase in speed, it is preferred at the instant the shunt $p$ is closed at 6 that the voltage $E_a$ developed in the armature $a$—$b$ should produce an ohmic drop in H at least equal to that established by the current $i$ or a fraction of this current which flows in H. It is merely a question of the number of turns in $e$—$f$ or of a shunt of this winding in order that the current in H can only be increased by the closure of $p$. It should be noted that in the contrary case, the speed will be increased. The exciter therefore may replace an inductive shunt of H.

Then only the voltage $v_b$ will be applied at the terminals of $c$—$d$ to produce the voltage $Eb$ in $a$—$b$.

If $v_b$ is increased, the current I will increase until the speed is stabilized. Beyond a certain value of the excitation I due to the voltage $v_b$, the current $i$ will reverse (dotted line arrow) and the torque A will become resisting, if desired. The current of the shunt $p$ will change from $I-i$ to $I+i$ and recuperation will result. But $Ea$ has changed sign and the electromotive force of $a$—$b$ is the difference of the absolute values of $Eb$ and $Ea$. The speed of the vehicle may be diminished until the saturation value of the flux in A is reached.

Finally, it should be pointed out that owing to the winding K producing compounding ampere-turns, the tension $Eb$ can be conserved alone to limit or reduce the speed.

*Second modification.*—The voltages $Ea$ and $Eb$ are introduced into the branch circuit $p$ (Fig. 5) produced in the armature $a$—$b$. All the contactors being assumed opened, the procedure is substantially the same as in starting in series direct motor operation according to the preceding modification by the closure of contactors 1, 5, and 2 with insertion of starting rheostat R1 substantially progressively short-circuited by the contactors 3 and 4. The current $i$ (solid line arrow) flows only through A, K, and H. The contactor 2 is then opened, the exciter $a$—$b$ is energized by the current $i$ and produces the voltage $Ea$ which, on closing of the contactor 6, tends rather to increase the current I in H. The dynamo $a$—$b$ is then excited by means of the winding $c$—$d$ put under the potential difference $v_b$. If the excitation of the winding $c$—$d$ is increased sufficiently to reverse the current $i$ in A, the new current $i$ is indicated by the dotted line arrow $i$. It will be seen that the current through $a$—$b$ becomes $I+i$, whereas in motor operation it was $I-i$.

To avoid prolonging the currents $I+i$ in $a$—$b$, the shunt $p_1$ may be closed, which shunt may be temporarily resistant between $f$ and G, by means of a contactor 6'. The contactor 5 is then opened. The current in $a$—$b$ is then the only current I in H. The resistance R2 of the shunt $p_1$ may then be short-circuited, which operation is preferably effected before energizing $c$—$d$. The essential difference should be noted between the two modifications. In one of them the voltages $Ea$ and $Eb$ are introduced into the branch H and in the other they are introduced into the shunt $p$.

In the tabulation shown in Fig. 5a there is given the order of opening and closing of the contactors corresponding to Fig. 5.

It is understood that numerous variations are possible within the scope of the invention with successive shuntings of $e$—$f$ for changing the number of turns of this winding combined with variations of the voltage $v_b$ or of the resistance R. All the modes of energizing the exciters to obtain the algebraic sum of the voltages $Ea$ and $Eb$ are obviously applicable to the systems of Figs. 4 and 5. The one used in the two examples given above relates to the compound semi-direct excitation of Fig. 2. In Fig. 5b, the field windings K and H are in direct series with the armature A of the main dynamo which permits operation with series-direct excitation, then by means of the contactor 6 the shunt $p$ is closed on the winding H after having developed in the armature $a$—$b$, the E. M. F.'s $Ea$ and $Eb$ for an excitation of its windings as in Figs. 1, 2, and 3.

In Fig. 5c, the armature $ab$ is introduced into the branch H during operation in series-direct excitation. For this, the contactor $6_b$, which was previously closed, is opened. The exciter $a$—$b$ is then excited in order that it may produce the E. M. F. $Ea$ to which end the contactor 7 is closed and 8 is opened, then the voltage $Eb$ is developed as in Figs. 1, 2, and 3.

In fact, the connections provided in Figs. 5b and 5c are equivalent to those of Figs. 4 and 5 but shown in simpler figures.

*Case of several motors.*—Whatever may be the interconnections of the motors in the different shunt circuits on the network, if it is desired to limit or reduce the speed, it is clearly possible to change from series-direct excitation to compound series-direct excitation, either, for example, according to the modification of Fig. 4, or by that of Fig. 5, or by any other, such as provided in the third paragraph from the beginning, and there may be used any of the exciters shown in Fig. 1, Fig. 2 or Fig. 3. Certain additional information, however, may be useful.

If the windings H are shunted in series-direct excitation, it is preferable to eliminate the shunts before changing to compound series-direct excitation.

By way of example, Fig. 6 shows a case of two motors connected in parallel and assumes the shunts of the windings H to be eliminated in the series-direct excitation. The dynamos are supposed to be run up to suitable speed with series-direct excitation. The closing of the contactors 10 and 11 applies the voltages of the exciters $a_1$—$b_1$ and $a_2$—$a_2$ to the terminals of the windings $H_1$ and $H_2$ of the dynamos $A_1$, $K_1$, $H_1$ and $A_2$, $K_2$, and $H_2$ in parallel on the network and having series-direct excitation. There is employed a modification No. 2 of Fig. 5, but the modification of Fig. 4 may also be employed to obtain the voltages $Ea$ and $Eb$. It should be noted that the exciting windings of the exciters producing the voltages $Eb$ should be arranged under the same voltage or should be in series and excited by the voltage $v_b$ at the terminals.

Complete stoppage may be obtained by a mechanical brake which may be electrically controlled.

The step of increasing the number of motors in a shunt across the network from 1 to 2 may be extended by increasing the number of motors in a parallel circuit from a condition 1 to a condition 2 and reciprocally, whatever may be the number of motors per circuit.

A motor unit may consist not of a single motor but of several motors in series connected permanently or at least in compound semi-direct operation. It is then possible to arrange the windings H all in series and side by side, and the voltage of the exciter $a$—$b$ may be applied in a circuit $p$ which contains the windings H.

This is shown by way of example in Fig. 7 where two motors $A_1$, $K_1$, $H_1$ and $A_2$, $H_2$, $K_2$ are assumed to constitute a motor unit in compound semi-direct operation, with extreme terminals M and N. The starting is assumed to be effected with series excitation obtained by known methods, as shown, the inductors $H_1$ and $H_2$ are adjacent for compound running, the local circuit $p$ will be closed by the contactor 6 and it comprises only one exciter armature $a$—$b$ for both motors.

The exciter $a$—$b$ is located either in the auxiliary bridge circuit $p$ or in the initial circuit $A_1$, $K_1$, $H_1$ and $H_2$, $K_2$, $A_2$, as shown by way of example. Exciters $a$—$b$ will be excited as in the foregoing. The arrows $i$ indicated in solid lines show the currents in motor operation and the arrows $i$ shown in dotted line show the reverse current during recuperation; I is the excitation current in the windings $H_1$ and $H_2$.

It is understood that the succession of connections may be easily established by a controller drum, by cam shaft, by contactors driven by a controller drum, or by a combination of these devices. Further, by using ordinary series parallel starting controllers, it is possible to effect the additional connections for compound semi-direct operation with a supplementary controller.

Since with slowly variable operation the field winding ampere-turns vary as in a direct compound dynamo, the torque may be represented and considered as for the case of an ordinary compound dynamo in generator operation, $$C = \lambda\ (NI - n\ i)\ i$$

in which $n$ and N are the number of turns of the direct series inductors K and of the separately excited inductor H and $\lambda$ is a proportional coefficient.

If NI and $n$ are suitably chosen, the torque may remain very slightly variable because if $i$ increases, the first factor diminshes while the second increases. If the iron is not saturated, the torque C varies proportionally to the product $(NI - n\ i)\ n\ i$, in which there is seen the product of two factors, the sum of which is constant.

It is also pointed out that in generator operation, the torque to be supplied for each dynamo is much lower than in motor operation, because in generator operation the ohmic drops are reversed in the armature and in the line. Hence, the current $i$ in the dynamo operating as generator is much smaller than when it is operating as motor, for equal acceleration.

It is obvious, therefore, that it is possible to have a recuperative braking using a single connection of compound excited dynamos, or at least to diminish in the braking stage the number of changes of connections required in motor operation, and also it is possible to dispense with variation of E$b$ during recuperation or at least to employ only the small number of values E$b$.

In fact, if one draws a circumference of diameter $AB=NI$ (Fig. 8) and raises a perpendicular on the diameter at a distance $BC=n\ i$ from one end of the diameter, the torque is proportional to the square of the perpendicular CD:

$$CD^2 = AC \times BC$$

With E$b$ and U constant, it is therefore possible to obtain a torque of approximately constant average value, or increasing, or decreasing, when the ampere-turns $ni$ decrease, which takes place automatically at diminishing speed. It is only necessary that at maximum speed the point C should be to the left of the center of the circumference and sufficiently close to A, or on the other hand, that C should be sufficiently close to O or that C should be on the part OB but close to O, in order that the square or perpendicular CD, respectively, should increase, or remain substantially constant, or decrease, when the speed decreases, and along with it CB or $ni$.

Fig. 9 shows recuperative braking of two motors $A_1$, $K_1$, $H_1$. Assuming them to be started in series with insertion of the exciter armature $a$—$b$ and closure of the single inductor circuit 7 of the field of the exciter $a$—$b$ on the voltage $v_b$ by the contactor $C_1$, then the voltage $v_a$ developed in a sub-exciter by the field winding $e$—$f$ from its closure of the shunt $p$ by the contactor $C_2$, permits change over to compound semi-direct operation. The weight of copper in the exciter inductors and those of the main motor is then reduced to the minimum. A large resistance regulatable for example by contactors $C_3$ and $C_4$ is arranged in the circuit of the exciting winding 7 of the exciter. In the tabulation of Fig. 9$a$, there is given the order of closing of the contactors corresponding to Fig. 9, for passing from operation in series direct excitation to compound semi-direct excitation.

Numerous variations are possible within the scope of the invention with successive shuntings of $e$—$f$ or changing the number of turns of this winding combined with variations of the voltage $v_b$ or of the resistance R.

In the diagrams of Figs. 1, 2, 3, 4, and 5, in which the voltage E$a$ is obtained by exciting the winding $e$—$f$ by the current $i$, it is preferred to shunt this winding by a strong self-induction coil. This self-induction coil L is shown by way of example in Fig. 9. It will be understood that during transitory operations, the variations in $i$ will be translated into great variations of the current energizing $e$—$f$. In regular operation, on the contrary, the currents will distribute themselves between $e$—$f$ and L, according to their ohmic resistances. This will permit temporarily transient operation increasing the series indirect ampere-turns and consequently to diminish the number of turns in the winding K.

There may be introduced into the circuit of the winding H a voltage E$c$ obtained from a small auxiliary exciter dynamo excited in any manner and driven at a speed proportional to the wheel speed and opposing the voltage E$b$. Thus, the tension in voltage E$b$—E$c$ of the dynamo A will increase while the speed of the vehicle will diminish.

In carrying out this scheme in the case in which the exciter of the winding H has itself a single winding and also voltages $v_b$ and $v_a$, if desired, there may be introduced into the circuit of this inductor a voltage $v_c$ produced by the armature of a small sub-exciter driven at a speed proportional to the wheel speed and excited separately, for example. In Fig. 9, for example, the armature for producing the voltage $v_c$ would be introduced into the circuit of the winding 7 of the exciter $a$—$b$.

I claim as my invention:

1. A method of economically regulating the speed of dynamos operating sometimes as motors and other times as generators, comprising obtaining motive power during starting by connecting the armatures of the dynamos and the field windings for series direct field excitation and when a desired speed of the armature of the dynamos is approximately obtained, limiting the increase and decrease in speed by changing the excitation from series-direct to compound semi-direct excitation whatever the connections between the series-direct excited dynamos may be at the time of making the change.

2. In a method of regulating the speed of principal dynamos having a plurality of field windings utilizing at first series direct excitation of the field windings followed by compound semi-direct excitation, the steps of changing from series direct excitation to compound semi-direct excitation comprising placing all of said field windings in series with the armature during starting of the dynamos, subsequently shunting one of said field windings and including an exciter dynamo in the shunt circuit, exciting a portion of the field windings of the exciter dynamo with current flowing through the principal dynamo, the speed of which is to be regulated, and separately exciting another portion of the field windings of the exciter dynamo with current taken from an external source and utilizing the separate tensions generated in the armature of the exciter for exciting the shunted field winding of the principal dynamo.

3. In a method of regulating the speed of principal dynamos having a plurality of field windings utilizing at first series direct excitation of the field windings followed by compound semi-direct excitation, the steps of effecting the compound semi-direct excitation by generating the current for such excitation in a single armature of an exciter, and exciting in a single winding of the exciter by the algebraic sum of two auxiliary tensions, the first being taken from a regulable source and the second being generated in a sub-exciter having a field excited by the current of the armature of the principal dynamo.

4. A method of regulating the speed of dynamos as set forth in claim 3, including the additional steps of hastening or increasing temporarily in the sub-exciter the variation of flux produced by a winding excited by the current of the armature of the principal dynamo by shunting a self-inductance coil about the field winding of the sub-exciter.

5. A method of regulating the speed of dynamos as set forth in claim 3, including the additional steps of driving the exciter and sub-exciter dynamos at an approximately constant speed.

6. A method of regulating the speed of dynamos as set forth in claim 3, including the additional steps of driving one of the exciters or sub-exciters at a speed proportional to that of the principal dynamo.

7. In a method of regulating the speed of principal dynamos having a plurality of field windings utilizing at first series direct excitation of the field windings followed by compound semi-direct excitation, the step of exciting a plurality of dynamos permanently connected in series only for compound semi-direct operation, wherein the exciting is effected by a single exciter having a single armature.

GRATZMULLER, LOUIS, RENÉ, EUGÉNE.